United States Patent [19]
Yasui et al.

[11] 3,928,303
[45] Dec. 23, 1975

[54] PROCESS FOR PRODUCING BUTADIENE POLYMER

[75] Inventors: Seimei Yasui; Yasuo Shinohara, both of Ibaraki; Yoshiharu Yagi, Toyonaka, all of Japan

[73] Assignee: Sumitomo Chemical Company, Limited, Osaka, Japan

[22] Filed: Mar. 1, 1973

[21] Appl. No.: 336,917

[30] Foreign Application Priority Data
Mar. 1, 1972 Japan.................. 47-21847
Mar. 31, 1972 Japan.................. 47-32969

[52] U.S. Cl......... 260/94.3; 252/429 B; 252/431 C; 252/431 N
[51] Int. Cl.²................C08F 136/06; C08F 4/40; B01J 31/14
[58] Field of Search........................ 260/94.3

[56] References Cited
UNITED STATES PATENTS

| | | | |
|---|---|---|---|
| 3,094,514 | 6/1963 | Tucker................ | 260/94.3 |
| 3,135,725 | 6/1964 | Carlson et al........ | 260/94.3 |
| 3,328,376 | 6/1967 | Bernemann et al.... | 260/94.3 |
| 3,438,958 | 4/1969 | Throckmorton....... | 260/94.3 |
| 3,462,406 | 8/1969 | Natta................. | 260/94.3 |
| 3,649,605 | 3/1972 | Throckmorton....... | 260/94.3 |
| 3,681,315 | 8/1972 | Yagi et al............ | 260/94.3 |
| 3,769,270 | 10/1973 | Saltman et al........ | 260/94.3 |
| 3,816,567 | 6/1974 | Yagi et al............ | 260/94.3 |
| 3,843,618 | 10/1974 | Yagi et al............ | 260/94.3 |
| 3,844,974 | 10/1974 | Throckmorton....... | 260/94.3 |
| 3,845,029 | 10/1974 | Throckmorton....... | 260/94.3 |

*Primary Examiner*—John C. Bleutge
*Attorney, Agent, or Firm*—Stewart and Kolasch, Ltd.

[57] ABSTRACT

A process for polymerization of butadiene which comprises contacting butadiene with a catalyst system comprising (A) an organic aluminum fluoride compound of the formula: $AlR_{3-n}F_n$ wherein R is alkyl, aryl or aralkyl and n is a real number larger than 1 and smaller than 2 and (B) a nickel or cobalt compound in the presence or absence of water as an activator and/or a halogenated alcohol, a halogenated carboxylic acid, a halogenated carboxylic acid anhydride, a halogenated ketone, a halogenated aldehyde, a phenol or a hydroquinone as a molecular weight regulator, whereby a butadiene polymer having a high content of cis-1,4 structure is produced.

15 Claims, 4 Drawing Figures

Water/Organic Aluminum Fluoride Compound (Molar ratio)

FIG. 4

PROCESS FOR PRODUCING BUTADIENE POLYMER

The present invention relates to a process for producing a butadiene polymer. More particularly, it relates to a process for producing a butadiene polymer having a high content of cis-1,4 structure and a properly regulated molecular weight by polymerization of butadiene (i.e. 1,3-butadiene) in the presence of a novel catalyst system.

For production of a butadiene polymer of cis-1,4 structure, there have been known a variety of catalyst systems, of which typical examples are as follows: (1) a composition comprising a halogenated titanium compound and an alkaylaluminum compound; (2) a composition comprising a halogenated cobalt compound and an alkylaluminum halide; (3) a composition comprising a nickel or cobalt compound, an alkylaluminum compound and a boron halide (Japanese Pat. No. 8193/1962); (4) a composition comprising a nickel salt of an organic acid, an organic compound containing a metal of the group I to III in the periodic table and an anhydrous metal fluoride (U.S. Pat. No. 3446788); (5) a composition comprising a nickel salt of an organic acid, an organic compound containing a metal of the group I to III in the periodic table and a boron trifluoride complex (U.S. Pat. No. 3483177); (6) a composition comprising a nickel salt of an organic acid, an organic compound containing a metal of the group I to III in the periodic table and hydrogen fluoride (French Pat. No. 1573934); (7) a composition comprising a nickel compound, an organic aluminum compound and an acidic metal halide (U.S. Pat. No. 3066127); (8) a composition comprising a nickel compound, a hydride of a metal of the group II or III in the periodic table or an organic compound containing a metal of the group I to III in the periodic table and an organic fluorine compound (German Pat. application No. 2017006); (9) a composition comprising a $\pi$-bonded organic nickel compound, an organic compound containing a metal of the group I to III in the periodic table and boron trifluoride, hydrogen fluoride, an active metal fluoride or an organic fluorine compound (German Pat. application No. 2016987); (10) a composition comprising an organic compound containing a metal of the group I to III in the periodic table and a nickel or cobalt salt of an organic fluorine compound (German Pat. application No. 2019751); (11) a composition comprising a cobalt compound, a trialkylaluminum and a halogenated phenol (Japanese Pat. No. 30696/1971); (12) a composition comprising a cobalt compound, a dialkylaluminum monofluoride and water (Dutch Pat. application No. 70.10844), etc.

In the course of the investigation on various organometallic compounds, it has been found that an organic aluminum fluoride compound of the formula:

$$AlR_{3-n}F_n \qquad \text{I}$$

wherein R is alkyl, aryl or aralkyl and n is a real number larger than 1 and smaller than 2 is associated to form a polymerlike material. In case of n being 1.5, for instance, the organic aluminum fluoride compound [I] indicates a molecular weight of 927 in benzene as the result of association. Similarly, the organic aluminum fluoride compound [I] wherein n is 1.75 gives a molecular weight of 12,970. In case of n being 2, the organic aluminum fluoride compound is an alkylaluminum difluoride itself, which is a white powder insoluble in various organic solvents.

It has also been found that a binary catalyst system comprising the said organic aluminum fluoride compound [I] and a nickel or cobalt compound exhibits an excellent catalytic activity in the polymerization of butadiene and affords a butadiene polymer having a high content of cis-1,4 structure and a high molecular weight with a high polymerization rate.

In this connection, it is highly notable that any binary catalyst system comprising the organic aluminum fluoride compound represented by the said formula [I] wherein, however, n is 1 or 2 (i.e. $AlR_2F$ or $AlRF_2$) and a cobalt or nickel compound is known to show no appreciable catalytic activity in the polymerization of butadiene. For example, it is reported in Japanese Pat. No. 8193/1962 and Kogyo Kagaku Zasshi (J.Chem.-Soc. Japan, Ind.Chem.Sec.), 71, 2060 (1968) that a catalyst system comprising diethylaluminum monofluoride or ethylaluminum difluoride with nickel naphthenate does not show any catalytic activity in the polymerization of butadiene. In Dutch Pat. application No. 68.02480 which relates to the polymerization of butadiene in the presence of a catalyst system comprising a dialkylaluminum monofluoride, an organic nickel compound and boron trifluoride-diethyl ether complex, it is described in Example 1 that, by a catalyst system comprising diethylaluminum monofluoride and the nickel salt of a carboxylic acid, the polymerization does not proceed. Further, in Dutch Pat. application No. 70.10844 it is shown that a catalyst system comprising diethylaluminum fluoride and cobalt octanoate exerts no catalytic activity in the polymerization of butadiene.

It has also been found that, by the incorporation of water as the third component into the said binary catalyst system, the polymerization rate and the molecular weight of the polymer can be remarkably increased. Thus, water is useful as an activator of the catalytic activity of the said binary catalyst system.

It has further been found that the incorporation of a halogenated alcohol, a halogenated carboxylic acid, a halogenated carboxylic acid anhydride, a halogenated ketone, a halogenated aldehyde, a phenol or a hydroquinone in the said binary system is effective in controlling the Mooney viscosity of the produced butadiene polymer. Thus, these compounds are useful as molecular weight regulators in the said binary catalyst system.

According to the present invention, the polymerization of butadiene is carried out by contacting butadiene with a catalyst system comprising (A) the organic aluminum fluoride compound [I], i.e. that having the formula: $AlR_{3-n}F_n$ wherein R is alkyl (e.g. methyl, ethyl, propyl, isopropyl, butyl, sec.-butyl, t-butyl, n-pentyl, n-hexyl, n-heptyl), aryl (e.g. phenyl, tolyl, xylyl) or aralkyl (e.g. benzyl, phenethyl, tolylmethyl, tolylethyl) and n is a real number larger than 1 and smaller than 2, preferably from 1.2 to 1.8, and (B) a nickel or cobalt compound in the presence or absence of (C) water and/or (D) at least one of a halogenated alcohol, a halogenated carboxylic acid, a halogenated carboxylic acid anhydride, a halogenated ketone, a halogenated aldehyde, a phenol and a hydroquinone to give a butadiene polymer having a high content of cis-1,4 structure.

The organic aluminum fluoride compound [I] can be prepared by various procedures. One of the typical procedures is the utilization of the reaction of a trialkylaluminum with anhydrous hydrofluoric acid (Italian Pat. No. 1357450). By adjusting the molar ratio of hydrofluoric acid to the trialkylaluminum to be larger than 1 and smaller than 2 in the said reaction, the desired organic aluminum fluoride compound [I] is obtained.

Another typical procedure is the utilization of the reaction between a trialkylaluminum and boron trifluoride etherate (Ann.Chem., 618, 31 (1958); Kogyo Kagaku Zasshi (J.Chem.Soc. Japan, Ind.Chem.Sec.), 71, 2060 (1968)). When the molar ratio of boron trifluoride to the trialkylaluminum is adjusted to be larger than 1/3 and smaller than 2/3 in such a reaction, there is obtained the desired organic aluminum fluoride compound [I].

A further typical procedure is the utilization of the reaction of an aluminum halide of the formula: $R_3Al_2X_3$ wherein X is chlorine, bromine or iodine and R is as defined above with a metal fluoride of the formula: $MF_2$ wherein M is calcium, barium or strontium (German Pat. No. 1116660) or of the reaction of a mixture of an aluminum halide of the formula: $R_2AlX$ wherein R and X are each as defined above and an aluminum halide of the formula: $RAlX_2$ wherein R and X are each as defined above with sodium fluoride (British Pat. No. 779873). In these reactions, the appropriate regulation of the molar ratio of the reactants affords the desired organic aluminum fluoride compound [I].

As the nickel or cobalt compound, there may be employed the nickel salt of an organic carboxylic acid (e.g. nickel acetate, nickel naphthenate, nickel octanoate, nickel benzoate) or its cobalt alternative, the nickel salt of an organic complex compound (e.g. nickel chloride-pyridine complex, tris(dipyridyl)nickel chloride, bis(ethylenediamine)nickel sulfate, bis-acetylacetonate nickel, bis-ethylacetoacetate nickel, bis-dimethylglyoxymato nickel) or its cobalt alternative, cobalt carbonyl and tetracarbonyl nickel, a $\pi$-bonded organic nickel compound (e.g. bis($\pi$-allyl)nickel, bis($\pi$-methallyl)nickel, bis($\pi$-crotyl)nickel, bis($\pi$-cyclooctenyl)nickel, bis($\pi$-cyclopentenyl)nickel or its cobalt alternative, or the like.

Examples of the molecular weight regulator which may be used with the catalyst composition of the invention are as follows:

1. Halogenated alcohols of the formula: RxOH wherein Rx is halogenated alkyl (e.g. trichloromethyl alcohol, 2,2,2-trichloroethyl alcohol, 2,2-dichloroethyl alcohol, 2,2,3,3-tetrachloro-1-propanol, 2,2,2-trifluoroethanol, pentafluoropropanol, perfluoroisobutyl alcohol, 1,1,1-trifluoropropanol-2,2,3-dibromopropanol, 2-bromoethanol, 2-iodoethanol, etc.).

2. Halogenated carboxylic acids of the formula: Ry-COOH wherein Ry is halogenated alkyl or halogenated aryl (e.g. monochloroacetic acid, dichloroacetic acid, trichloroacetic acid, 2,2,3,3- tetrachloropropionic acid, 2,2-dichloropropionic acid, α-chloropropionic acid, perchloro-n-butyric acid, m-chlorobenzoic acid, 2,4-dichlorobenzoic acid, 2,5-dichlorobenzoic acid, 2,6-dichlorobenzoic acid, tetrachlorophthalic acid, trifluoroacetic acid, pentafluoropropionic acid, pentafluorobenzoic acid, bromoacetic acid, iodoacetic acid, etc.).

3. Halogenated carboxylic acid anhydrides of the formula: $(RyCO)_2O$ wherein Ry is as defined above (e.g. monochloroacetic anhydride, dichloroacetic anhydride, trichloroacetic anhydride, 2,2,3,3-tetrachloropropionic anhydride, 2,2-dichloropropionic anhydride, α-chloropropionic anhydride, perchloro-n-butyric anhydride, m-chlorobenzoic anhydride, 2,4-dichlorobenzoic anhydride, 2,5-dichlorobenzoic anhydride, 2,6-dichlorobenzoic anhydride, tetrachlorophthalic anhydride, trifluoroacetic anhydride, pentafluoropropionic anhydride, pentafluorobenzoic anhydride, bromoacetic anhydride, iodoacetic anhydride, etc.).

4. Halogenated ketones of the formula: Rz-CO-Rz' wherein Rz and Rz' are each alkyl, halogenated alkyl, aryl or halogenated aryl and at least one of them is always halogenated alkyl or halogenated aryl (e.g. perchloroacetone, 1,1,1,3-tetrachloro-3,3-dibromoacetone, 1,1,1,3-tetrachloroacetone, 1,1,1-trichloroacetone, 1,1-dichloroacetone, 1,3-dichloroacetone, perchloromethyl ethyl ketone, trichlorophenyl ketone, 1,3-dibromo-1,1,3,3-tetrachloroacetone, trifluoroacetone, hexafluoroacetone, pentafluoroethyl methyl ketone, tetrafluoroacetone, benzoyltrifluoroacetone, trifluoroacetylacetone, m-bromoacetophenone, p-bromoacetophenone, p-iodoacetophenone, etc.).

5. Halogenated aldehydes of the formula: Ry-CHO wherein Ry is as defined above (e.g. trichloroacetaldehyde, tribromoacetaldehyde, triiodoacetaldehyde, 3,3,3-trichloropropionaldehyde, 3,3,3-tribromopropionaldehyde, 2,2,3,3-tetrachlorobenzaldehyde, 2,2,3,3-tetrabromobenzaldehyde, 2,2,3,3-tetraiodobenzaldehyde, perchlorobenzaldehyde, perbromobenzaldehde, perchlorobutyraldehyde, 4,4,4-tribromobutyraldehyde, trifluoroacetaldehyde, pentafluoropropionaldehyde, pentafluorobenzaldehyde, etc.).

6. Phenols of the formula:

wherein $R_1$ to $R_5$ are each hydrogen or halogen or the combination of any adjacent two of $R_1$ to $R_5$ is an aromatic condensed ring (e.g. phenol, o-cresol, m-cresol, p-cresol, 2,2-xylenol, 2,4-xylenol, 3,5-xylenol, 3,4-xylenol, p-t-butylphenol, 2,6-dimethyl-4-t-butylphenol, 3-methyl-6-t-butylphenol, 2-methyl-4,6-di-t-butylphenol, 2,4-t-butylphenol, 2,6-di-t-butylphenol, 2,6-di-t-butyl-4-methylphenol, α-naphthol, β-naphthol anthranol, o-chlorophenol, m-chlorophenol, p-chlorophenol, p-bromophenol, o-bromophenol, m-bromophenol, 2,3-dichlorophenol, 2,4,6-trichlorophenol, 2,4,5-trichlorophenol, pentafluorophenol, 2,3,5,6-tetrafluorophenol, p-fluorophenol, 4-iodophenol, etc.).

7. Hydroquinones of the formula:

wherein $R_1'$ to $R_4'$ are each hydrogen or halogen or the combination(s) of $R_1'$ with $R_2'$ and/or of $R_3'$ with $R_4'$ is an aromatic condensed ring(s) (e.g. 2,3,5,6-tetrachlorohydroquinone, 2,3,5-trichlorohydroquinone, 2,5-dichlorohydroquinone, 2-chlorohydroquinone, 2,3,5,6-tetrafluorohydroquinone, 2,3,5-trifluorohydroquinone, 2,5-difluorohydroquinone, 2-fluorohydroquinone, 2,3,5,6-tetrabromohydroquinone, 2,3,5-tribromohydroquinone, 2,5-dibromohydroquinone, 2-bromohydroquinone, 2,3,5,6-tetraiodohydroquinone, 2,3,5-triiodohydroquinone, 2,5-diiodohydroquinone, 2-iodohydroquinone, hydroquinone, 1,4-dihydroxy-2,3-dichloronaphthalene, 1,4-dihydroxyanthracene, 1,4-dihydroxyphenathrene, etc.).

The amount of the catalyst system to be used in the polymerization may be optionally determined, and taking account of elimination of the polymerization heat, it is usual to use the nickel or cobalt compound in an amount of from 0.0005 to 2.0 mmol, preferably from 0.01 to 1.0 mmol, based on 1 mol of the butadiene monomer.

The molar ratio of the organic aluminum fluoride compound [I] to the nickel or cobalt compound in the catalyst system may vary in the range from 1 to 1000, preferably from 1 to 100.

The amount of water as the activator is determined depending on the value of n in the organic aluminum fluoride compound [I] and may be usually from 0.01 to (6-3n) mol (preferably from 0.05 to (4-2n) mol) based on 1 mol of the organic aluminum fluoride compound [I].

The molecular weight regulator is used in an amount of from 0.01 to 50 mol, preferably from 0.1 to 10 mol, based on 1 mol of the organic aluminum fluoride compound [I].

The mixing of each of the components for preparation of the catalyst system can be accomplished in any optional order and is ordinarily carried out in the presence of a diluent. For obtaining the catalyst system with a higher activity, the component (A) and the component (B) may be allowed to contact each other in the presence of a small amount of an aliphatic conjugated diene (e.g. butadiene, isoprene). Such technique will prevent the formation of any insoluble material during the preparation and thus can minimize the harmful influence caused by contamination with a small amount of impurity in the polymerization reaction system.

The preparation of the catalyst system may be executed at a temperature from −80° to 70°C, preferably from −20° to 50°C. A typical example of the concrete procedures for preparation of the catalyst system is as follows: the component (B) is admixed with a diluent, a small amount of butadiene is added thereto while ice-cooling, and the component (A) and water or its mixture with any solvent, if water is added, are added thereto in this order. Another typical example is as follows: the component (B) is admixed with a diluent, a small amount of butadiene is added thereto while ice-cooling, the component (A) and the molecular weight regulator, if water is used, are added thereto in this order, the mixture is aged at an appropriate temperature and water is incorporated therein, if water is added. In the above latter procedure, the incorporation of water may be effected not at the final stage but after the addition of butadiene and before the addition of the component (A).

Examples of the solvent as the diluent for the catalyst system and/or as the reaction medium for the polymerization include aromatic hydrocarbons (e.g. benzene, toluene, xylene), aliphatic hydrocarbons (e.g. hexane, heptane, octane), alicyclic hydrocarbons (e.g. cyclohexane, decalin), hydrogenated aromatic hydrocarbons (e.g. tetralin), halogenated hydrocarbons (e.g. dichloroethane, methylene chloride), etc.

The polymerization is carried out by contacting butadiene with the catalyst system in a liquid medium at a temperature from −20° to 150°C, preferably from 0° to 100°C. The catalyst system and butadiene may be supplied to the reaction system in an optional order in the presence or absence of a liquid medium.

The recovery of the produced polymer from the reaction mixture may be performed in a per se conventional manner. For instance, the reaction mixture is poured into a large amount of aqueous or alcoholic medium such as methanol, isopropanol, methanol-acetone or hot water, if necessary, with previous addition of an antioxidant (e.g. phenyl-$\beta$-naphthylamine, 2,6-di-t-butyl-p-cresol), and then the precipitate is collected and washed with methanol to obtain a substantially colorless rubber-like polymer.

The butadiene polymer produced by the present invention is a rubber-like solid. The analysis of the micro-structure according to the infrared absorption method reveals the presence of the cis-1,4 structure in most butadiene units.

The catalyst system of the invention has a quite high catalytic activity and can be employed in a small amount or a low concentration in the polymerization. Thus, under usual polymerization conditions, it can be dissolved in the reaction medium. Further, in the polymerization using the catalyst system of the invention, the gel formation due to generation of heat during the reaction and the inferior stereoregularity of the polymer caused thereby as usually seen in case of using a highly active catalyst system are never observed. Furthermore, the catalyst system can be employed under a wide range of polymerization conditions to give a butadiene polymer showing a high content of cis-1,4 structure. In this connection, it may be noted that the production of butadiene polymer having a high molecular weight has been difficult by the use of a conventional catalyst system containing a nickel compound as its component.

Practical and presently preferred embodiments of the present invention are illustratively shown in the following Examples wherein percent and parts are by weight. The intrinsic viscosity of the polymer is measured on the toluene solution at 30°C and the micro structure of the polymer is determined from the infrared absorption spectrum according to the Morero's method [D. Morero et al.: Chim. e Ind., 41, 758 (1959)]. Further, the whole operation leading to completion of the polymerization is effected in a nitrogen stream.

EXAMPLE 1

In a 1 liter volume four-necked flask equipped with a dropping funnel, a reflux condenser and a thermometer, there is charged a 20 percent benzene solution of triethylaluminum (85.5 g, 150 mmol) in a nitrogen stream, and a 1 percent benzene solution of anhydrous hydrofluoric acid (500 g, 250 mmol) is dropwise added thereto with stirring over 3 hours during which the inner temperature is kept at 18 to 20°C and ice-water of 0°C is allowed to pass through the reflux condenser. The temperature is gradually raised, and the mixture is stirred at 25°C for 1 hour and then under reflux for 2 hours. After benzene is distilled off under normal pressure, the mixture is subjected to distillation at 140°C (oil bath temperature) under a pressure of 0.9 mmHg.

Triethylaluminum is not distilled out. Then, the temperature of the oil bath is raised to 160°C and, after 10 minutes, the flask is cooled whereby a film-like material ( 14.7 g) is obtained. Yield (for $AlEt_{1.5}F_{1.5}$), 99 percent. This material is thoroughly soluble in benzene. The molecular weight of the thus obtained organic aluminum fluoride compound is 927 when determined according to the Beckmann's cryoscopic method in a nitrogen stream on the benzene solution (concentration, 0.1 mmol/ml). By calculation, it is understood that this compound corresponds to the associated substance of about 10 molecules of $AlEt_{1.5}F_{1.5}$. By elementary analysis, the presence of aluminum in the amount of 27.4 percent and of fluorine in the amount of 28.8 percent is confirmed (F/Al = 1.49) (theoretical amount: Al, 27.3 percent; F, 28.8 percent), which indicates that the compound corresponds to $AlEt_{1.5}F_{1.5}$. In the NMR spectrum obtained on the benzene solution (concentration, 1 mmol/ml), a signal at 9.96 ppm is observed, revealing the presence of the methylene moiety of the ethyl group attached to the Al-F linkage, but there is not seen any signal at 9.35 ppm which is based on the methylene moiety of the ethyl group in $AlEt_3$.

In a 200 ml volume glass made bottle, a benzene solution of the above prepared organic aluminum fluoride compound ($AlEt_{1.5}F_{1.5}$) (0.4 ml, 0.4 mmol), hexane (10 ml) and a 10 percent hexane solution of butadiene (5 ml) are charged, and a hexane solution of nickel naphthenate (1 ml, 0.04 mmol) is added thereto. The resultant mixture is stirred at 25°C for 30 minutes, and anhydrous hexane (109 ml) is added thereto. After cooling to −30°C, butadiene (24.9 g) is added. The bottle is sealed and placed into a rotary constant temperature bath of 50°C, and polymerization is executed for 3 hours. The reaction mixture is poured into methanol (200 ml) containing a stabilizer, and the mixture is stirred by the aid of a mixer. The precipitate is separated and dried at 50°C for 16 hours under reduced pressure to give butadiene polymer (11.51 g). Yield, 46.2 %. [$\eta$] , 3.99 dl/g. Micro-structure: cis-1,4, 96.1 %; trans-1,4, 2.9 %; vinyl, 1.0 %.

EXAMPLE 2

In a reaction vessel as in Example 1, a 20 percent benzene solution of triethylaluminum (57 g, 100 mmol) is charged, and a 1 percent benzene solution of anhydrous hydrofluoric acid (250 g, 125 mmol) is dropwise added thereto with stirring over 2 hours during which the inner temperature is kept at 18° to 20°C. Stirring is continued for a further 6 hours at 20°C. After benzene is distilled off under normal pressure, the mixture is subjected to distillation at 140°C (oil bath temperature) under a pressure of 10 mmHg. Triethylaluminum is not distilled out. Then, the pressure is reduced to 2 mmHg. Diethylaluminum fluoride is not distilled out. The remaining viscous liquid (10.1 g) is the objective organic aluminum fluoride compound which is used in the subsequent polymerization reaction in the form of a benzene solution. Yield (for $AlEt_{1.75}F_{1.25}$), 99.9 percent. By elementary analysis, the presence of aluminum in the amount of 27.5 % and of fluorine in the amount of 24.2 % is confirmed (F/Al = 1.25) (theoretical amount: Al, 27.5 %; F, 24.3 %), which indicates that the compound corresponds to $AlEt_{1.75}F_{1.25}$.

In a 200 ml volume glass made bottle, a benzene solution of the above prepared organic aluminum fluoride compound ($AlEt_{1.75}F_{1.25}$) (1 ml, 0.4 mmol), hexane (10 ml), a 10 percent hexane solution of butadiene (5 ml) and a hexane solution of nickel naphthenate (1 ml, 0.04 mmol) are charged, and the contents are stirred at 40°C for 15 minutes. Anhydrous hexane (109 ml) and butadiene (25 g) are added thereto. After sealing the bottle, polymerization is carried out at 50°C for 5 hours to give butadiene polymer (5.12 g). Yield, 20.6 %. [$\eta$], 3.29 dl/g. Micro-structure: cis-1,4, 97.1 %; trans-1,4, 2.0 %; vinyl, 0.9 %.

EXAMPLE 3

The organic aluminum fluoride compound ($AlEt_{1.25}F_{1.75}$) is prepared according to the following reaction formula: $AlEt_3 + 7/12\ BF_3OEt_2 = AlEt_{1.25}F_{1.75} + 7/12\ BEt_3 + 7/12\ OEt_2$.

In a 200 ml volume four-necked flask equipped with a dropping funnel, a reflux condenser, a tube for introduction of nitrogen and a thermometer, there are charged triethylaluminum (6.28 g, 55 mmol) and xylene (10 ml), and a solution of boron trifluoride etherate (23.9 mmol) in xylene (5 ml) is dropwise added thereto with stirring over 30 minutes during which the inner temperature is kept at 50° to 60°C. The resultant mixture is stirred at 139° to 140°C for 3 hours under reflux. After being cooled to room temperature, the reaction mixture is subjected to distillation under normal pressure, whereby the following distillates are obtained: at 35°C, diethyl ether (1.6 g); at 94° to 96°C, triethyl boron (2.4 g); at 139° to 140°C, xylene. Distilling out of boron trifluoride etherate is not observed. The distillation residue is evaporated to dryness at 140 to 160°C under a pressure of 0.9 mmHg for 30 minutes so as to remove xylene whereby a white cotton-like material (5.19 g) is obtained. Yield (for $AlEt_{1.25}F_{1.75}$), 97.9 percent. This material is soluble in benzene but with a trace of white precipitates. The molecular weight of the thus obtained organic aluminum fluoride compound is 12970 when determined according to the Beckmann's cryoscopic method on the benzene solution (concentration, 1 mmol/ml). By calculation, it is understood that this compound corresponds to the associated substance of about 134 molecules of $AlEt_{1.25}F_{1.75}$. The above mentioned white precipitate in case of being dissolved in benzene is supposed to be a contaminant having a larger molecular weight. By elementary analysis, the presence of aluminum in the amount of 27.9 percent and of fluorine in the amount of 34.4 percent is confirmed (F/Al = 1.75) (theoretical amount: Al, 28 %; F, 34.5 %), which indicates that the compound corresponds to the chemical formula: $AlEt_{1.25}F_{1.75}$.

In a 200 ml volume glass made bottle, a solution of the above prepared organic aluminum fluoride compound ($AlEt_{1.25}F_{1.75}$) in benzene (1 ml, 0.4 mmol), anhydrous hexane (10 ml), a 10 percent solution of butadiene in hexane (5 ml) and a solution of nickel naphthenate in hexane (1 ml, 0.04 mmol) are charged, and the contents are stirred at 25°C for 30 minutes. Anhydrous hexane (109 ml) and butadiene (25 g) are added thereto. After sealing the bottle, polymerization is carried out at 50°C for 3 hours to give butadiene polymer as a white solid (12.85 g). Conversion, 51.54 % [$\eta$], 4.55 dl/g. Micro-structure: cis-1,4, 97.3 %; trans-1,4, 2.2 %; vinyl, 0.5 %.

EXAMPLE 4

The organic aluminum fluoride compound ($AlEt_{1.10}F_{1.90}$) is prepared according to the following reaction formula: $AlEt_3 + 19/30\ BF_3OEt_2 = AlEt_{1.10}F_{1.90}$ + 19/30 BEt$_3$ + 19/30 Et$_2$O.

In a reaction vessel flask as in Example 3, a 15 percent xylene solution of triethylaluminum (44 mmol) is charged, and a solution of boron trifluoride etherate (28 mmol) in xylene (5 ml) is dropwise added thereto at 50° to 80°C with stirring. After the addition is completed, the resultant mixture is stirred under reflux for 6 hours. The reaction mixture is subjected to distillation under normal pressure, whereby the following distillates are obtained: at 32°C, diethyl ether; at 94° to 96°C, triethyl boron; at 139° to 140°C, xylene. Distilling out of boron trifluoride etherate is not observed. The distillation residue is evaporated to dryness at 140° to 160°C under a pressure of 0.8 mmHg for 1 hour whereby any distillate other than xylene is not obtained. The residual white powder is 4.2 g (theoretical amount for AlFt$_{1.10}$F$_{1.90}$, 4.18 g), so that the yield is almost quantitative. By elementary analysis, the presence of aluminum in the amount of 28.4 % and of fluorine in the amount of 38.1 % is confirmed (F/Al = 1.90) (theoretical amount: Al, 28.4 %; F, 38.0 %), which indicates that the compound corresponds to AlEt$_{1.10}$F$_{1.90}$. It is hardly soluble in hexane.

In a 200 ml volume glass made bottle, the above prepared organic aluminum fluoride compound (AlEt$_{1.10}$F$_{1.90}$) (0.4 mmol), anhydrous hexane (10 ml), a 10 percent hexane solution of butadiene (7 ml) and a hexane solution of nickel naphthenate (1 ml, 0.04 mmol) are charged, and the contents are stirred at 20°C for 30 minutes. Anhydrous hexane (10 ml) and butadiene (25 g) are added thereto. After sealing the bottle, polymerization is carried out at 50°C for 3 hours to give butadiene polymer as a white solid (1.5 g). Conversion, 6.02 %. [η], 5.30 dl/g. Micro-structure: cis-1.4, 95.3 %; trans-1,4, 3.5 %; vinyl, 1.2%.

REFERENCE EXAMPLE 1

In a reaction vessel as in Example 1, a 20 percent solution of triethylaluminum in benzene (62.8 g, 110 mmol) is charged, and a 1 percent solution of anhydrous hydrofluoric acid in benzene (440 g, 220 mmol) is dropwise added thereto with stirring. The resultant mixture is then reacted as in Example 1. Benzene is removed off by distillation under reduced pressure whereby a white powder (10.4 g) is obtained. This compound is not soluble in benzene. By elementary analysis, the presence of aluminum in the amount of 28.9 % and of fluorine in the amount of 40.2 percent is confirmed (F/Al = 2.0) (theoretical amount: Al, 28.7 %; F, 40.4 %), which indicates that the compound corresponds to AlEtF$_2$.

The polymerization reaction is executed as in Example 1 but using the above obtained organic aluminum fluoride compound AlEtF$_2$ (0.4 mmol) at 50°C. Even after 3 hours, butadiene polymer cannot be produced.

REFERENCE EXAMPLE 2

The polymerization reaction is carried out as in Example 1 but using a hexane solution of AlEt$_2$F (1 mmol/ml; manufactured by Ethyl Corporation) at 50°C. Even after 3 hours, butadiene polymer cannot be produced.

Figure 1:
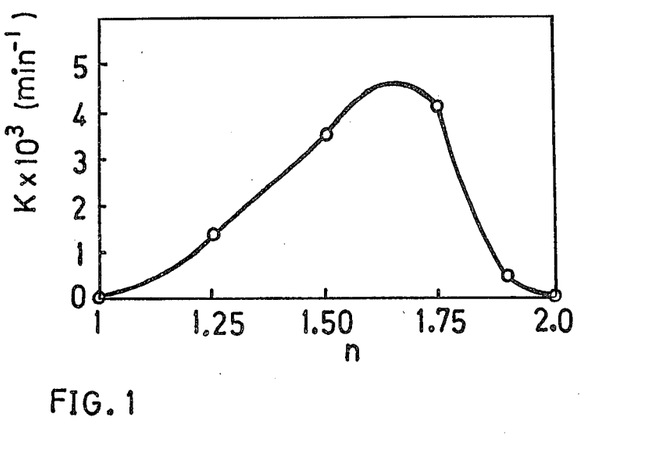
Figure 2:
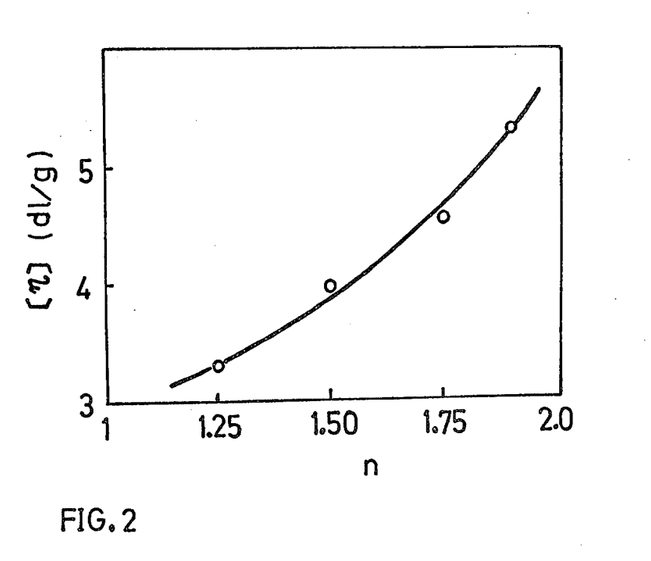

Based on the results obtained in Example 1 to 4 and Reference Examples 1 to 2, the relationships of the polymerization rate with the value of n in AlR$_{3-n}$F$_n$ and of the intrinsic viscosity with the value of n in AlR$_{3-n}$F$_n$ are graphed in FIGS. 1 and 2 of the accompanying drawings.

EXAMPLE 5

In a 150 ml volume glass made bottle, liquid butadiene (16 g) and anhydrous benzene (50.5 ml) are charged, and a benzene solution of AlEt$_{1.5}$F$_{1.5}$ (0.4 ml, 0.4 mmol) and a 0.339 percent benzene solution of cobalt octanoate (1.13 ml) are added thereto in this order. The bottle is sealed and placed into a rotary constant temperature bath of 20°C, and the polymerization is carried out for 5 hours. The reaction mixture is treated as in Example 1 to give butadiene polymer as a white rubber-like solid (1.35 g). Yield, 8.4 %. [η], 7.38. Micro-structure: cis-1,4, 70.8 %; trans-1,4, 0.9 %; vinyl, 28.3 %.

EXAMPLE 6

The polymerization is carried out as in Example 5 but using a benzene solution of AlEt$_{1.25}$F$_{1.75}$ (0.4 ml. 0.4 mmol) to give butadiene polymer as a white rubber-like solid. Conversion, 9.57 %. [η], 9.96 dl/g. Micro-structure: cis-1.4, 56.8 %; trans-1,4, 3.9 %; vinyl, 39.3 %.

EXAMPLE 7

In a 200 ml volume glass made bottle, a benzene solution of AlEt$_{1.5}$F$_{1.5}$ prepared as in Example 1 (0.4 ml, 0.4 mmol), hexane (10 ml) and a 10 % hexane solution of butadiene (5 ml) are charged, and a hexane solution of nickel naphthenate (1 ml, 0.04 mmol) is added thereto. The contents are stirred at 25°C for 30 minutes. Anhydrous hexane is added thereto, and the mixture is cooled to −30°C. Then, butadiene (24.9 g) and moistened toluene containing 100 ppm of water are added thereto to make 125 ml. After sealing the bottle, the polymerization is carried out at 50°C for a designed time, and the reaction mixture is treated as in Example 1.

The results are shown in Table 1.

Table 1

| No. | Molar ratio of H$_2$O/ AlEt$_{1.5}$F$_{1.5}$ | Polymerization time (min.) | Produced polymer Weight (g) | Produced polymer Yield (%) | K × 10$^3$ (min.$^{-1}$) | [η] (dl/g) | ML$_{1+4}^{100}$ | cis-1,4 (%) | trans-1,4 (%) | vinyl (%) |
|---|---|---|---|---|---|---|---|---|---|---|
| 1 | 0 | 180 | 11.51 | 46.2 | 3.44 | 3.99 | — | 96.1 | 2.9 | 1.0 |
| 2 | 0.4 | 120 | 11.90 | 47.7 | 5.41 | 4.58 | — | 97.3 | 1.9 | 0.8 |
| 3 | 0.6 | 120 | 18.50 | 74.2 | 11.29 | 4.69 | 116 | 97.1 | 2.0 | 0.9 |
| 4 | 0.8 | 180 | 8.00 | 32.1 | 2.15 | 5.77 | — | 97.2 | 1.8 | 1.0 |

Note:
K = 1/T · ln 1/(1 − x) wherein x is the conversion and T is the polymerization time.

EXAMPLE 8

The polymerization is carried out as in Example 7 but using AlEt$_{1.75}$F$_{1.25}$ prepared as in Example 2 (0.4 mmol) in place of AlEt$_{1.5}$F$_{1.5}$.

The results are shown in Table 2. In the experiment No. 3, the reaction is effected in the presence of 2,4,6-tri-chlorophenol as the molecular weight regulator. In this case, the preparation of the catalyst system is executed in the following manner: reacting the compound $AlEt_{1.75}F_{1.25}$ and nickel naphthenate for 30 minutes, adding 2,4,6-trichlorophenol thereto and reacting the resultant mixture at 20°C for 5 minutes.

From the Table, it is apparent that the molecular weight of the polymer is decreased by the incorporation of 2,4,6-trichlorophenol.

EXAMPLE 10

The polymerization is effected as in Example 7 but using the molecular weight regulator. The addition of the molecular weight regulator is carried out at 20°C, 30 minutes after the addition of nickel naphthenate, and the mixture is stirred at 20°C for 10 minutes. Then, anhydrous hexane, butadiene and moistened hexane are added thereto.

The results are shown in Table 4. The polymerization temperature is 50°C. since tetrachlorohydroquinone is hardly soluble in hexane, it is employed as a solution in dichloroethane (concentration, 0.04 mmol/1.6 ml).

From this Table, it is apparent that the molecular weight of the polymer is decreased by the incorporation of the molecular weight regulator.

Table 2

| No. | Molar ratio of $H_2O/AlEt_{1.75}F_{1.25}$ | Polymerization time (min.) | Molecular weight regulator Name | Amount (mmol) | Produced polymer Weight (g) | Yield (%) | $K \times 10^3$ (min.$^{-1}$) | $[\eta]$ (dl/g) | cis-1,4 (%) | trans-1,4 (%) | vinyl (%) |
|---|---|---|---|---|---|---|---|---|---|---|---|
| 1 | — | 300 | — | — | 5.12 | 20.6 | 1.40 | 3.29 | 97.1 | 2.0 | 0.9 |
| 2 | 0.6 | 180 | — | — | 13.40 | 53.8 | 4.28 | 5.35 | 97.0 | 2.1 | 0.9 |
| 3 | 0.4 | 180 | 2,4,6-Tri-chlorophenol | 0.16 | 19.75 | 79.3 | 8.76 | 3.09 | 96.3 | 2.7 | 1.0 |

EXAMPLE 9

The polymerization is carried out as in Example 7 but using $AlEt_{1.25}F_{1.75}$ (0.4 mmol) prepared as in Example 3 in place of $AlEt_{1.5}F_{1.5}$.

The results are shown in Table 3.

Table 3

| No. | Molar ratio of $H_2O/AlEt_{1.25}F_{1.75}$ | Polymerization time (min.) | Produced Polymer Weight (g) | Yield (%) | $K \times 10^3$ (min.$^{-1}$) | $[\eta]$ (dl/g) | cis-1,4 (%) | trans-1,4 (%) | vinyl (%) |
|---|---|---|---|---|---|---|---|---|---|
| 1 | 0 | 180 | 9.31 | 37.3 | 2.61 | 4.46 | 97.3 | 2.2 | 0.5 |
| 2 | 0.15 | 180 | 12.63 | 50.6 | 3.91 | 5.10 | 97.1 | 2.1 | 0.8 |
| 3 | 0.3 | 180 | 9.95 | 39.9 | 2.83 | 5.37 | 97.1 | 2.0 | 0.9 |

Table 4

| No. | Molar ratio of $H_2O/AlEt_{1.5}F_{1.5}$ | Polymerization time (min.) | Molecular weight regulator Name | Amount (mmol) | Produced polymer Weight (g) | Yield (%) | $K \times 10^3$ (min.$^{-1}$) |
|---|---|---|---|---|---|---|---|
| 1 | 0.5 | 120 | — | — | 10.95 | 44.0 | 4.82 |
| 2 | 0.5 | 120 | Tetrachlorohydroquinone | 0.04 | 18.45 | 74.1 | 11.3 |
| 3 | 0.5 | 120 | Tetrachlorohydroquinone | 0.08 | 22.60 | 90.8 | 19.8 |
| 4 | 0.3 | 120 | Tetrachlorohydroquinone | 0.12 | 17.20 | 69.1 | 9.78 |
| 5 | 0.5 | 180 | 2,4,6-Trichlorophenol | 0.08 | 14.40 | 57.8 | 4.79 |
| 6 | 0.5 | 180 | 2,4,6-Trichlorophenol | 0.16 | 14.30 | 57.4 | 4.74 |
| 7 | 0.5 | 180 | Hexachloroacetone | 0.16 | 12.16 | 48.9 | 3.23 |
| 8 | 0.5 | 180 | 1,3-Dichloroacetone | 0.08 | 9.70 | 38.91 | 2.74 |
| 9 | 0.5 | 300 | Dichloroacetic acid | 0.16 | 2.0 | 8.03 | 0.28 |
| 10 | 0.5 | 300 | Trichloroacetic acid | 0.08 | 6.31 | 25.8 | 0.99 |
| 11 | 0.5 | 300 | Chloral | 0.08 | 3.61 | 14.5 | 0.53 |
| 12 | 0.5 | 300 | 3,3,2,2-Tetrachloropropanol | 0.16 | 4.28 | 17.2 | 0.63 |

| No. | $[\eta]$ (dl/g) | $ML_{1+4}^{100}$ | cis-1,4 (%) | trans-1,4 (%) | vinyl (%) |
|---|---|---|---|---|---|
| 1 | 5.85 | — | 96.9 | 2.2 | 0.9 |
| 2 | 4.04 | 95 | — | — | — |
| 3 | 3.11 | 68 | 95.7 | 2.3 | 2.0 |
| 4 | 2.96 | 59 | — | — | — |
| 5 | 4.54 | — | 96.6 | 2.1 | 1.3 |
| 6 | 3.18 | — | — | — | — |
| 7 | 3.05 | — | — | — | — |
| 8 | 4.61 | — | 97.1 | 2.1 | 0.8 |
| 9 | 3.34 | — | — | — | — |
| 10 | 3.56 | — | — | — | — |
| 11 | 3.38 | — | — | — | — |
| 12 | 4.08 | — | — | — | — |

EXAMPLE 11

In the same manner as in Example 7, the polymerization is performed using the compound $AlEt_{1.5}F_{1.5}$ (0.4 mmol) and nickel naphthenate (0.04 mmol) in the presence of a fluorine-containing compound as the molecular weight regulator.

The results are shown in Table 5.

Table 5

| No. | Molar ratio of $H_2O$/ $AlEt_{1.5}F_{1.5}$ | Polymerization time (min.) | Molecular weight regulator Name | Amount (mmol) | Produced polymer Weight (g) | Yield (%) | $[\eta]$ (dl/g) | Micro structure of produced polymer cis-1,4 (%) | trans-1,4 (%) | vinyl (%) |
|---|---|---|---|---|---|---|---|---|---|---|
| 1 | 0.5 | 120 | — | — | 10.95 | 44.0 | 5.85 | 96.9 | 2.2 | 0.9 |
| 2 | 0.5 | 180 | Hexafluoro-isopropanol | 0.16 | 6.31 | 25.3 | 3.96 | — | — | — |
| 3 | 0.5 | 80 | Hexafluoro-acetone | 0.08 | 22.85 | 91.7 | 2.83 | 96.8 | 2.3 | 0.9 |
| 4 | 0.5 | 180 | Hexafluoro-acetone | 0.16 | 4.92 | 19.7 | 3.45 | — | — | — |
| 5 | 0.5 | 120 | Trifluoro-acetone | 0.08 | 16.0 | 64.1 | 4.87 | — | — | — |
| 6 | 0.5 | 180 | Trifluoro-acetic acid | 0.08 | 14.3 | 57.3 | 3.96 | — | — | — |
| 7 | 0.5 | 180 | Perfluoro-butyric anhydride | 0.04 | 11.2 | 44.9 | 3.53 | 97.1 | 2.1 | 0.8 |

REFERENCE EXAMPLE 3

The polymerization reaction is carried out as in Example 7 but using $AlEt_2F$ (0.4 mmol) (manufactured by Ethyl Corporation) in place of the compound $AlEt_{1.5}F_{1.5}$.

The results are shown in Table 6.

Figure 3:
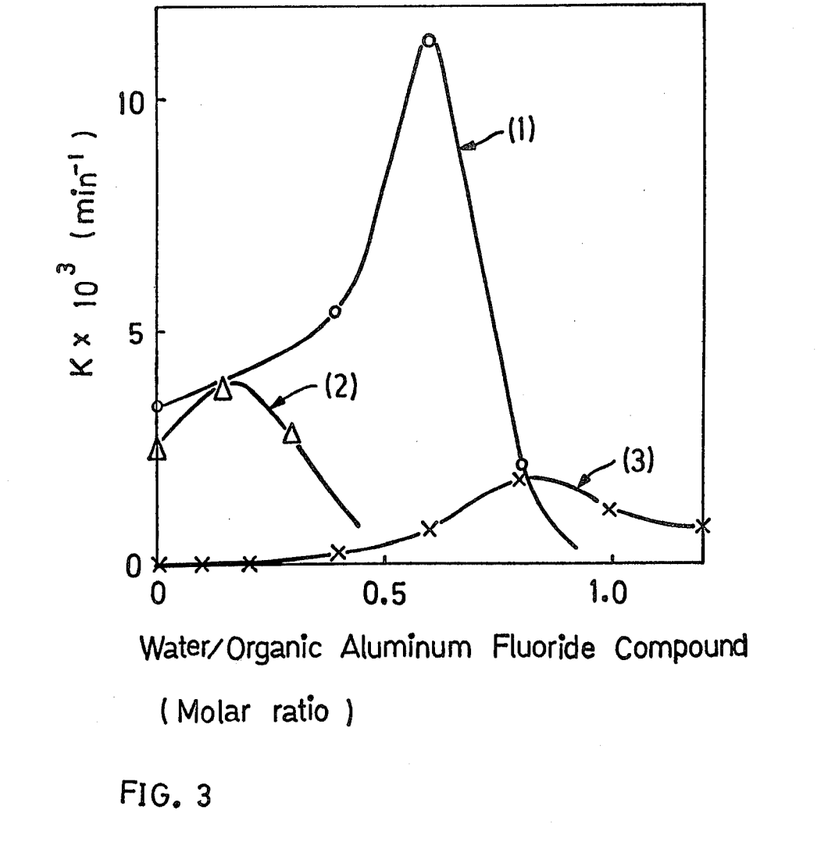
Figure 4:
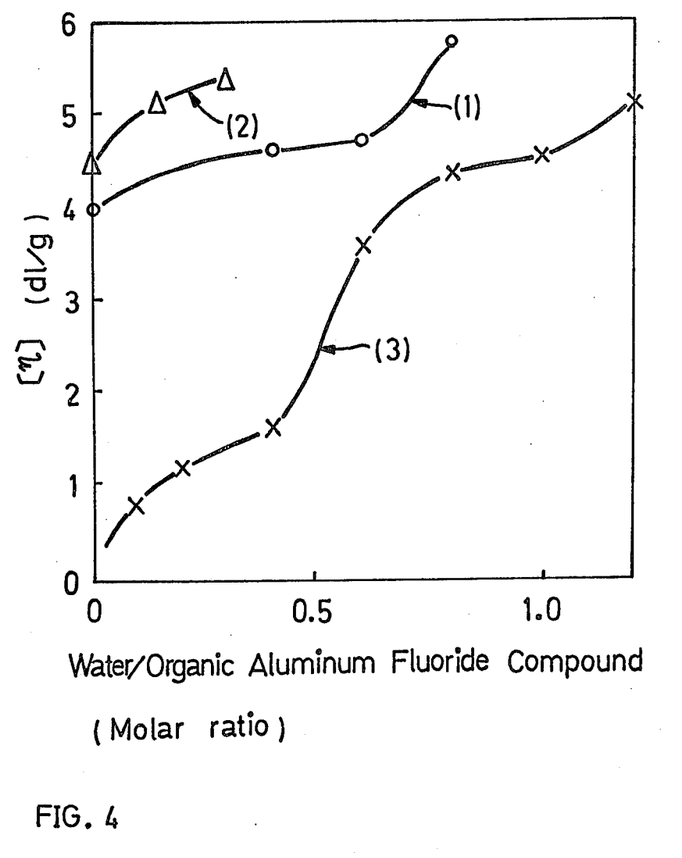

For comparison with the results obtained in Examples 7 and 9, the relationships between the molar ratio of water and the organic aluminum fluoride compound in the catalyst system and the polymerization rate and between the said molar ratio and the intrinsic viscosity of the polymer are graphed respectively in FIGS. 3 and 4 of the accompanying drawings wherein the lines (1), (2) and (3) indicate respectively the relationships in the system of $AlEt_{1.5}F_{1.5}$-nickel naphthenate-water, the system of $AlEt_{1.25}F_{1.75}$-nickel naphthenate-water and the system of $AlEt_2F$-nickel naphthenate-water.

From these Figures, it is apparent that the catalyst system of the invention containing $AlEt_{1.5}F_{1.5}$ or the compound $AlEt_{1.25}F_{1.75}$ is superior to the catalyst system containing the compound $AlEt_2F$, particularly in the polymerization rate.

Table 6

| No. | $AlEt_2F$ Amount used (mmol) | Molar ratio of $H_2O$/ $AlEt_2F$ | Polymerization time (min.) | Produced polymer Weight (g) | Yield (%) | $K \times 10^3$ (min.$^{-1}$) | $[\eta]$ (dl/g) | Micro structure of produced polymer cis-1,4 (%) | trans-1,4 (%) | vinyl (%) |
|---|---|---|---|---|---|---|---|---|---|---|
| 1 | 0.4 | 0 | 600 | 0 | 0 | 0 | — | — | — | — |
| 2 | 0.4 | 0.1 | 600 | 0.02 | 0.1 | 0.001 | 0.78 | — | — | — |
| 3 | 0.4 | 0.2 | 600 | 0.37 | 1.5 | 0.02 | 1.16 | 97.4 | 0.6 | 2.0 |
| 4 | 0.4 | 0.4 | 300 | 2.07 | 8.3 | 0.29 | 1.58 | 98.0 | 0.7 | 1.3 |
| 5 | 0.4 | 0.6 | 300 | 5.05 | 20.3 | 0.76 | 3.55 | 97.6 | 0.9 | 1.5 |
| 6 | 0.4 | 0.8 | 300 | 6.91 | 27.7 | 1.80 | 4.37 | 97.3 | 0.8 | 1.9 |
| 7 | 0.4 | 1.0 | 300 | 6.83 | 27.4 | 1.07 | 4.51 | 97.1 | 1.0 | 1.9 |
| 8 | 0.4 | 1.2 | 300 | 5.36 | 21.5 | 0.81 | 5.08 | 97.0 | 1.2 | 1.8 |

Example 12

In a 150 ml volume glass made pressure polymerization bottle in which the air is replaced with nitrogen, there are charged liquid butadiene (16 g) and anhydrous benzene. A benzene solution of the compound $AlEt_{1.5}F_{1.5}$ (0.4 ml, 0.4 mmol) and a solution of cobalt octanoate in benzene (3.39 g/l) (1.13 ml) are added thereto in this order, and moistened benzene containing 480 ppm of water is added to make 52 ml. The bottle is sealed and placed into a rotary constant temperature bath of 20°C, and the polymerization is carried out for 5 hours. The reaction mixture is treated as in Example 7 to give butadiene polymer as a white rubber-like solid.

The results are shown in Table 7.

In Experiments Nos. 5 and 6, the reaction is effected in the presence of a molecular weight regulator.

From this Table, it is apparent that the molecular weight of the polymer is greatly decreased by the addition of the molecular weight regulator.

Table 7

| No. | Molar ratio of $H_2O$/ $AlEt_{1.5}F_{1.5}$ | Molecular weight regulator Name | Amount (mmol) | Produced polymer Weight (g) | Yield (%) | $K \times 10^3$ (min.$^{-1}$) | $[\eta]$ (dl/g) | Micro structure of produced polymer cis-1,4 (%) | trans-1,4 (%) | vinyl (%) |
|---|---|---|---|---|---|---|---|---|---|---|
| 1 | — | — | — | 1.35 | 8.4 | 0.29 | 7.38 | 70.8 | 0.9 | 28.3 |
| 2 | 0.3 | — | — | 0.72 | 4.6 | 0.16 | 9.31 | — | — | — |
| 3 | 0.6 | — | — | 1.50 | 9.6 | 0.34 | 10.13 | 50.4 | 15.1 | 34.5 |
| 4 | 0.9 | — | — | 0.80 | 5.1 | 0.18 | 13.53 | — | — | — |
| 5 | 0.6 | Tetrachloro-hydroquinone | 0.08 | 0.31 | 1.9 | 0.06 | 3.51 | — | — | — |
| 6 | 0.6 | hexachloro-acetone | 0.08 | 0.26 | 1.6 | 0.046 | 3.84 | — | — | — |

EXAMPLE 13

The polymerization is carried out in the same manner as in Example 12 but using $AlEt_{1.25}F_{1.75}$ in place of $AlEt_{1.5}F_{1.5}$ to give butadiene polymer as a white rubber-like solid.

The results are shown in Table 8.

Table 8

| No. | Molar ratio of $H_2O$/ $AlEt_{1.25}F_{1.75}$ | Produced polymer Weight (g) | Produced polymer Yield (%) | $K \times 10^3$ (min.$^{-1}$) | $[\eta]$ (dl/g) | Micro structure of produced polymer cis-1,4 (%) | trans-1,4 (%) | vinyl (%) |
|---|---|---|---|---|---|---|---|---|
| 1 | — | 1.50 | 9.57 | 0.34 | 9.96 | 56.8 | 3.9 | 39.3 |
| 2 | 0.3 | 2.13 | 13.6 | 0.49 | 8.32 | — | — | — |
| 3 | 0.5 | 0.50 | 3.2 | 0.11 | 7.36 | 65.3 | 10.6 | 24.1 |

What is claimed is:

1. A process for the polymerization of butadiene to give a rubber-like solid which comprises contacting butadiene with a catalyst system consisting essentially of (A) an organic aluminum fluoride compound of the formula: $AlR_{3-n}F_n$ wherein R is alkyl, aryl or aralkyl and n is a real number larger than 1 and smaller than 2 and (B) an organic nickel compound selected from the group consisting of nickel salts of organic carboxylic acids, nickel salts of organic complex compounds, tetracarbonyl nickel and $\pi$-bonded organic nickel compounds, the molar ratio of the organic aluminum fluoride compound to the organic nickel compound being in a range of from 1:1 to 1000:1, to produce said rubber-like solid butadiene polymer having a high content of cis-1,4 structure.

2. The process according to claim 1, wherein n is 1.2 to 1.8.

3. The process according to claim 1, wherein the nickel compound is used in an amount of from 0.0005 to 2.0 mmol based on 1 mol of the butadiene monomer.

4. The process according to claim 1, wherein the molar ratio of the organic aluminum fluoride compound to the nickel compound is in a range from 1 to 100:1.

5. The process according to claim 1, wherein the polymerization is carried out at a temperature from −20° to 150°C.

6. The process according to claim 1, wherein the polymerization is carried out in a liquid medium.

7. The process according to claim 1, wherein the polymerization is carried out in the presence of water.

8. The process according to claim 7, wherein the amount of water is from 0.01 to (6-3n) mol based on 1 mol of the organic aluminum fluoride compound.

9. The process according to claim 1, wherein the polymerization is carried out in the presence of a molecular weight regulator selected from the group consisting of halogenated alcohols, halogenated carboxylic acids, halogenated carboxylic acid anhydrides, halogenated ketones, halogenated aldehydes, phenols and hydroquinones.

10. The process according to claim 9, wherein the molecular weight regulator is (1) a halogenated alcohol of the formula: RxOH wherein Rx is halogenated alkyl, (2) a halogenated carboxylic acid of the formula: Ry-COOH wherein Ry is halogenated alkyl or halogenated aryl, (3) a halogenated carboxylic acid anhydride of the formula: $(RyCO)_2O$ wherein Ry is as defined above, (4) a halogenated ketone of the formula: Rz-CO-Rz′ wherein Rz and Rz′ are each alkyl, halogenated alkyl, aryl or halogenated aryl and at least one of them is always halogenated alkyl or halogenated aryl, (5) a halogenated aldehyde of the formula: Ry-CHO wherein Ry is as defined above, (6) a phenol of the formula:

wherein $R_1$ to $R_5$ are each hydrogen or halogen or the combination of any adjacent two of $R_1$ to $R_5$ is an aromatic condensed ring or (7) a hydroquinone of the formula:

wherein $R_1'$ to $R_4'$ are each hydrogen or halogen or the combination(s) of $R_1'$ with $R_2'$ and/or of $R_3'$ with $R_4'$ is an aromatic condensed ring(s).

11. The process according to claim 9, wherein the amount of the molecular weight regulator is from 0.01 to 50 mol based on 1 mol of the organic aluminum fluoride compound.

12. A process for the polymerization of butadiene to give a rubber-like solid which comprises contacting butadiene with a catalyst system consisting of (A) an organic aluminum fluoride compound of the formula: $AlR_{3-n}F_n$ wherein R is alkyl, aryl or aralkyl and n is a real number larger than 1 and smaller than 2 and (B) an organic nickel compound selected from the group consisting of nickel acetate, nickel naphthenate, nickel octanoate, nickel benzoate, nickel chloride-pyridine complex, tris(dipyridyl) nickel chloride, bis(ethylenediamine)nickel sulfate, bis-acetylacetonate nickel, bis-ethylacetoacetate nickel, bis-dimethylglyoxymato nickel, tetracarbonyl nickel, bis($\pi$-allyl)nickel, bis($\pi$-methallyl)nickel, bis($\pi$-crotyl) nickel, bis($\pi$-cyclooctenyl)nickel and bis($\pi$-cyclopentenyl) nickel, the molar ratio of the organic aluminum fluoride compound to the organic nickel compound being in the range of from 1 : 1 to 1000 : 1, to produce said rubber-like solid butadiene polymer having a high content of cis-1,4 structure.

13. The process according to claim 12, wherein the nickel compound is used in an amount of from 0.0005 to 2.0 mmol based on 1 mol of the butadiene monomer.

14. The process according to claim 13, wherein the polymerization is carried out at a temperature of from −20° to 150°C.

15. The process according to claim 13, wherein the polymerization is carried out in the presence of from 0.01 to (6-3n) mol of water based on 1 mol of the organic aluminum fluoride compound.

* * * * *